United States Patent [19]

Keramati et al.

[11] 4,246,490
[45] Jan. 20, 1981

[54] ROTATING NOZZLE GENERATOR

[75] Inventors: Bahram Keramati; Vedanth Kadambi, both of Scotia, N.Y.

[73] Assignee: General Electric Company, Schenectady, N.Y.

[21] Appl. No.: 16,896

[22] Filed: Mar. 2, 1979

[51] Int. Cl.³ .............................................. H02K 7/18
[52] U.S. Cl. ........................................ 290/1 A; 290/52
[58] Field of Search ................... 290/1, 52; 415/71-75

[56] References Cited

U.S. PATENT DOCUMENTS

| 3,187,191 | 6/1965 | Baggs | 290/52 |
|---|---|---|---|
| 3,353,028 | 11/1967 | Braikevitch et al. | 290/52 |
| 3,556,670 | 1/1971 | Tucker | 415/75 |
| 3,697,190 | 10/1972 | Haentjens | 415/73 |
| 3,809,491 | 5/1974 | Banyai | 415/73 X |
| 4,069,673 | 1/1978 | Lapeyre | 290/52 X |

Primary Examiner—Gene Z. Rubinson
Assistant Examiner—W. E. Duncanson, Jr.
Attorney, Agent, or Firm—Robert R. Schroeder; James C. Davis, Jr.; Paul R. Webb, II

[57] ABSTRACT

A rotating nozzle generator is described for producing electricity from the direct expansion of a liquid to a two-phase mixture of liquid and vapor. The device includes liquid inlet means, a rotor, at least one fluid flow groove along the length of the rotor, which groove changes in size in communication with the liquid inlet means, generator windings on the outer or inner surface of the rotor and fluid outlet means in communication with the fluid flow groove.

9 Claims, 4 Drawing Figures

U.S. Patent             Jan. 20, 1981             4,246,490
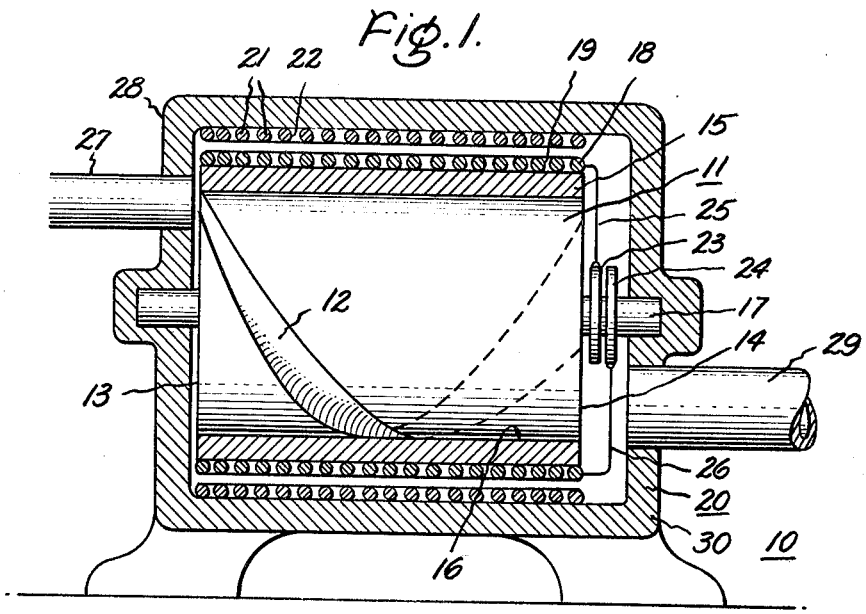
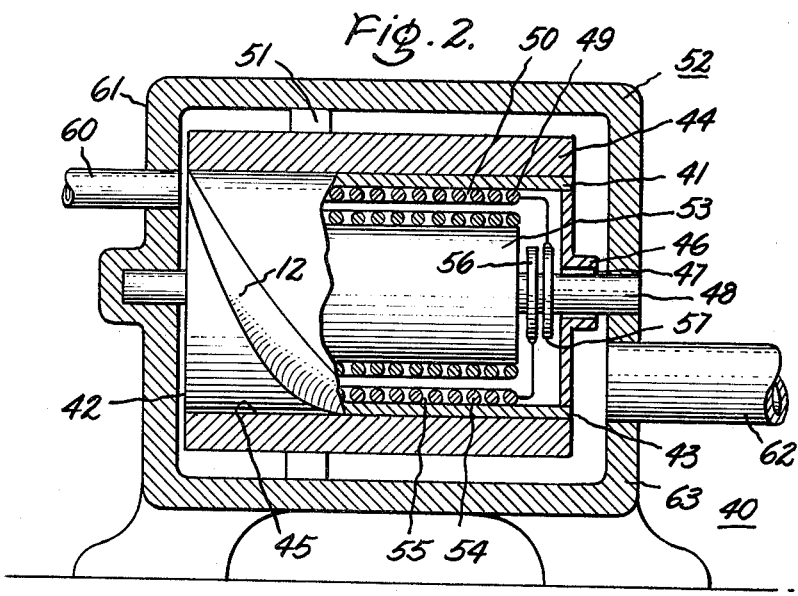
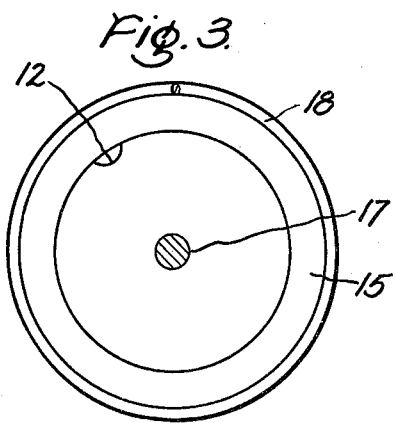
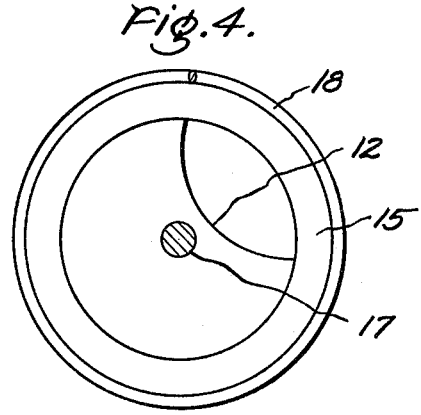

ROTATING NOZZLE GENERATOR

This invention relates to a rotating nozzle generator and, more particularly, to such a generator for producing electricity from the direct expansion of a liquid to a two-phase mixture of liquid and vapor.

In copending patent application Ser. No. 935,587, filed Aug. 21, 1978, and entitled "Rotating Nozzle Expander", there is described and claimed such an expander which includes liquid inlet means, at least one fluid flow passage changing in size in communication with the liquid inlet means, the fluid flow passage mounted rotatably, and fluid outlet means in communication with the fluid flow passage. This copending patent application is assigned to the same assignee as the present invention.

The present device is useful for electrical generation from warm liquids when a sink at a lower temperature exists. Such situations arise in bottoming cycles, ocean thermal energy conversion and energy recovery from industrial waste heat.

Current turbomachines are not suitable for the expansion of a liquid to a two-phase mixture. This is primarily due to erosion problems associated with the presence of large quantities of liquid in high velocity vapor which impinges upon rotating blades. The copending rotating nozzle expander application overcomes these problems by confining the expanding liquid-vapor mixture to an internal flow passage. The present invention converts thermal energy directly to electrical energy.

The primary object of our invention is to provide a rotating nozzle generator which produces electricity by expanding directly a liquid to a two-phase mixture of liquid and vapor.

In accordance with one aspect of our invention, a rotating nozzle expander includes a rotor, the rotor having a groove along its length, the rotor groove size changing from one end of the groove to the other end, a sleeve encasing the rotor thereby defining a fluid flow passage, an electrical generator within the housing, the rotating component of the electrical generator associated with the rotor and sleeve, the stationary component of the electrical generator mounted within the housing and spaced from the rotating component, fluid inlet means for the housing, fluid outlet means for the housing, the rotor, sleeve and rotor windings rotatably mounted within the housing, the rotor groove inlet in communication with the fluid inlet means, and the rotor groove outlet in communication with the fluid outlet means.

These and various other objects, features and advantages of the invention will be better understood from the following description taken in connection with the accompanying drawing in which:

FIG. 1 is a schematic view of a rotating nozzle generator made in accordance with our invention;

FIG. 2 is a schematic view of a modified rotating nozzle generator made in accordance with our invention;

FIG. 3 is an end view of the rotor at the inlet end of the rotating nozzle generator shown in FIG. 1, and FIG. 4 is an end view of the rotor at the outlet end of the rotating nozzle generator shown in FIG. 1.

In FIG. 1 of the drawing, there is shown generally at 10 a rotating nozzle generator made in accordance with our invention. Generator 10 comprises a rotor 11 with a surface groove 12 thereon which changes in size from one end 13 to the other end 14 of rotor 11. A sleeve 15 encases rotor 11 thereby providing a fluid flow passage within groove 12 and the interior surface 16 of sleeve 15. Rotor 11 has a shaft 17 extending from opposite ends of rotor 11. Rotor windings 18 surround the exterior surface of sleeve 15 and are embedded thereon by a suitable insulation 19. A housing 20 has rotor 11, associated sleeve 15, and rotor windings 18 rotatably mounted therein by means of rotor shaft 17. Stator windings 21 are positioned within housing 20 by means of a suitable insulation 22. Windings 21 surround and are spaced from rotor windings 18. Slip rings 23 and 24 are positioned on shaft 17 and connected by means of wires 25 and 26 to rotor windings 18 and stator windings 21, respectively. Liquid inlet means 27 in the form of an inlet pipe is shown connected to a side wall 28 of housing 20 and communicates with the inlet groove 12. Fluid outlet means 29 in the form of a pipe is shown connected to the opposite end wall 30 of housing 20 and communicates with the outlet of groove 12.

In FIG. 2 of the drawing, there is shown generally at 40 a modified rotating nozzle generator made in accordance with our invention. Generator 40 comprises a rotor 41 with a surface groove 12 thereon which changes in size from one end 42 to the other end 43 of rotor 41. A sleeve 44 encases rotor 41 thereby providing a fluid flow passage within groove 12 and the interior surface 45 of sleeve 44. Rotor 41 has a shaft 46 with a bearing 47 mounted rotatably on a shaft 48. Rotor windings 49 surround the interior surface of rotor 41 and are embedded thereon by means of a suitable insulation 50. A seal 51 is provided within a housing 52 and is positioned between the interior surface of housing 52 and the external surface of sleeve 44. A stator 53 is positioned within rotor 41 and mounted on shaft 48. Stator windings 54 are embedded on stator 53 by means of a suitable insulation 55. Stator windings 54 are surrounded by rotor windings 49 and spaced therefrom. Slip rings 56 and 57 are positioned on shaft 48 and connected by means of wires 58 and 59 to rotor windings 49 and stator windings 54, respectively. Liquid inlet means 60 in the form of an inlet pipe is shown connected to a side wall 61 of housing 52 and communicates with the inlet of groove 12. Fluid outlet means 62 in the form of a pipe is shown connected to the opposite end wall 63 of housing 18 and communicates with the outlet of groove 12.

In FIG. 3 of the drawing, there is shown an end view of rotor 11 from end 28 of housing 20.

In FIG. 4 of the drawing, there is shown an end view of rotor 11 from end 30 of housing 20. Groove 12 is shown where its size is the largest.

In the operation of the rotating generator device as shown in FIGS. 1, 3 and 4 of the drawing, a liquid, for example, in the form of waste water at a temperature of 140° F. and at a pressure of 14.7 psia is fed to liquid inlet 27 of generator 10. The liquid is made to flow through the passage defined by groove 12 on rotor 11 and interior surface 16 of associated sleeve 15 by means of directing channels (not shown) which are placed at the inlet. The change in the passage area along the rotor depends on the specific design conditions (thermodynamic states) at the inlet and outlet of the rotor. In this example, since the pressure of the water at the inlet is above the saturation pressure at 140° F. (2.89 psia), the pressure needs to be reduced to the saturation pressure (2.89 psia) before vapor generation may begin. This is accomplished in an initially converging passage flow area. It is calculated that at the point of minimum passage flow area, vaporization starts and continues through the passage to the outlet in the diverging section of the groove. At the outlet end of the housing, the resulting two-phase mixture is directed in a direction nearly normal to the rotational axis. The momentum of the outflowing two-phase mixture will rotate the rotor, its associated sleeve, and the rotor windings thereon within the stator windings within the housing. This rotation will rotate the rotor shaft thereby generating electricity. The liquid expansion into a two-phase mixture of liquid and vapor will provide a lower temperature liquid at the outlet of the housing, and also provide vapor which can be used subsequently.

In the operation of the rotating generator device as shown in FIG. 2 of the drawing, a liquid, for example, in the form of waste water at a temperature of 140° F. and at a pressure of 14.7 psia is fed to liquid inlet 60 of generator 10. The liquid is made to flow through the passage defined by groove 12 on rotor 41 and interior surface 45 of associated sleeve 44 by means of directing channels (not shown) which are placed at the inlet. The change in the passage area along the rotor depends on the specific design conditions (thermo-dynamic states) at the inlet and outlet of the rotor. In this example, since the pressure of the water at the inlet is above the saturation pressure at 140° F. (2.89 psia), the pressure needs to be reduced to the saturation pressure (2.89 psia) before vapor generation may begin. This is accomplished in an initially converging passage flow area. It is calculated that at the point of minimum passage flow area, vaporization starts and continues through the passage to the outlet in the diverging section of the groove. At the outlet end of the housing, the resulting two-phase mixture is directed in a direction nearly normal to the rotational axis. The momentum of the outflowing two-phase mixture will rotate within the housing, the rotor, the rotor windings thereon, the rotor and the associated sleeve around the stator windings. This rotation will rotate the rotor shaft thereby generating electricity. The liquid expansion into a two-phase mixture of liquid and vapor will provide a lower temperature liquid at the outlet of the housing, and also provide vapor which can be used subsequently.

Our unique rotating nozzle generator has the capability of providing electrical power, and vapor for certain other applications. The housing can be made of various materials depending on the fluid source. Suitable electrical generators include various types, such as, windings, permanent magnet, and salient pole generators.

While a successful expansion of the liquid into a two-phase mixture requires the flow passage size to vary appropriately from the inlet to the exit, several configurations and geometries are possible for the passage shape and of the rotor. For example, the passage may be rectangular or circular in shape, decrease in size first and then increase towards the outlet or increase continuously from the inlet to the outlet, depending upon the conditions of the liquid at the inlet. Similarly, the rotor may be cylindrical, conical or of any other appropriate shape to accommodate the variation in passage size and permit the smooth entry as well as exit of the fluid. Additionally, multiple passages may be employed on the rotor surface to increase the output and obtain a compact device.

While other modifications of the invention and variations thereon which may be employed within the scope of the invention have not been described, the invention is intended to include such as may be embraced within the following claims:

What we claim as new and desire to secure by Letters Patent of the United States is:

1. A rotating nozzle generator comprising a housing, a rotor mounted within the housing, the rotor having a groove along its length, the rotor groove size changing from one end of the groove to the other end, a sleeve encasing the rotor thereby defining a liquid fluid flow passage, an electrical generator within the housing, the rotating component of the electrical generator associated with the rotor and sleeve, the stationary component of the electrical generator mounted within the housing and spaced from the rotating component, fluid inlet means for the housing, fluid outlet means for the housing, the rotor groove inlet in communication with the fluid inlet means, and the rotor groove outlet in communication with the fluid outlet means.

2. A rotating nozzle generator as in claim 1, in which rotor windings are associated with the rotor and sleeve, and stator windings are mounted within the housing and spaced from the rotor windings.

3. A rotating nozzle generator as in claim 2, in which the rotor windings are positioned along the length of the exterior surface of the sleeve, and the stator windings are positioned along the length of the interior surface of the housing.

4. A rotating nozzle generator as in claim 2, in which a stator with associated stator windings along its length is positioned within and spaced from the rotor and its associated sleeve, and rotor windings are positioned along the interior surface of the rotor.

5. A rotating nozzle generator as in claim 1, in which the electrical generator is a permanent magnet generator.

6. A rotating nozzle generator as in claim 1, in which the electrical generator is a salient pole generator.

7. A rotating nozzle generator as in claim 1, in which there are a plurality of flow passages on the rotor.

8. A rotating nozzle generator as in claim 1, in which the rotor flow passage extends around any number of degrees of the rotor surface.

9. A rotating nozzle generator as in claim 7, in which the rotor flow passages extend around any number of degrees of the rotor surface.

* * * * *